United States Patent
Kniesel et al.

(10) Patent No.: US 11,401,412 B2
(45) Date of Patent: Aug. 2, 2022

(54) POLYESTER FOR PROFILE EXTRUSION AND/OR PIPE EXTRUSION

(71) Applicant: BASF SE, Ludwigshafen am Rhein (DE)

(72) Inventors: Simon Kniesel, Ludwigshafen (DE); Rainer Klenz, Ludwigshafen (DE)

(73) Assignee: BASF SE, Ludwigshafen (DE)

( * ) Notice: Subject to any disclaimer, the term of this patent is extended or adjusted under 35 U.S.C. 154(b) by 0 days.

(21) Appl. No.: 16/330,501

(22) PCT Filed: Aug. 28, 2017

(86) PCT No.: PCT/EP2017/071535
§ 371 (c)(1),
(2) Date: Mar. 5, 2019

(87) PCT Pub. No.: WO2018/050426
PCT Pub. Date: Mar. 22, 2018

(65) Prior Publication Data
US 2019/0203037 A1    Jul. 4, 2019

(30) Foreign Application Priority Data
Sep. 14, 2016   (EP) .................................. 16188762

(51) Int. Cl.
| H01B 3/42 | (2006.01) |
| C08L 67/02 | (2006.01) |
| H01B 3/44 | (2006.01) |
| C08L 67/00 | (2006.01) |
| C08L 23/08 | (2006.01) |

(52) U.S. Cl.
CPC ........... *C08L 67/02* (2013.01); *C08L 23/0876* (2013.01); *C08L 67/00* (2013.01); *H01B 3/421* (2013.01); *H01B 3/422* (2013.01); *H01B 3/423* (2013.01); *H01B 3/441* (2013.01); *H01B 3/447* (2013.01); *C08L 2203/206* (2013.01)

(58) Field of Classification Search
None
See application file for complete search history.

(56) References Cited

U.S. PATENT DOCUMENTS

| 3,264,272 A * | 8/1966 | Rees ...................... C08F 255/00 428/36.9 |
| 3,639,527 A * | 2/1972 | Brinkman ............... C08L 67/02 525/64 |
| 3,651,014 A | 3/1972 | Witsiepe |
| 4,219,628 A * | 8/1980 | Weemes .................. C08L 67/02 525/166 |
| 4,269,964 A | 5/1981 | Freitag et al. |
| 4,440,908 A * | 4/1984 | McClain .................... C08J 3/02 428/407 |
| 4,584,360 A | 4/1986 | Paul et al. |
| 4,732,949 A | 3/1988 | Paul et al. |
| 4,873,289 A | 10/1989 | Lindner et al. |
| 5,272,236 A | 12/1993 | Lai et al. |
| 5,496,887 A | 3/1996 | Braune |
| 5,824,412 A * | 10/1998 | Hausmann ........... C08G 81/027 428/378 |
| 5,824,750 A | 10/1998 | Weber et al. |
| 6,222,132 B1 * | 4/2001 | Higashiura ............ H01B 3/421 174/120 R |
| 6,262,185 B1 | 7/2001 | Heitz et al. |
| 2005/0176920 A1 * | 8/2005 | Caldwell ................ C08G 63/78 528/272 |
| 2006/0235185 A1 * | 10/2006 | Phelps ................... C08G 63/85 528/272 |
| 2006/0281846 A1 | 12/2006 | Hager et al. |
| 2016/0276059 A1 | 9/2016 | Kniesel et al. |

FOREIGN PATENT DOCUMENTS

| CA | 674595 | * 11/1963 |
| DE | 2842005 A1 | 4/1980 |
| DE | 3334782 A1 | 10/1984 |

(Continued)

OTHER PUBLICATIONS

European Search Report for Patent No. EP 16188762, dated Feb. 16, 2017.

(Continued)

*Primary Examiner* — David J Buttner
(74) *Attorney, Agent, or Firm* — Marshall, Gerstein & Borun LLP (57) ABSTRACT

Thermoplastic molding compositions containing
  A) from 29 to 99.99% by weight of a polyester,
  B) from 0.01 to 10% by weight of an ionomer composed of at least one copolymer of
  $B_1$) from 30 to 99.9% by weight of ethylene
  $B_2$) from 0 to 60% by weight of 1-octene or 1-butene or propylene or a mixture of these and
  $B_3$) from 0.01 to 70% by weight of functional monomers, where the functional monomers are selected from the group of the carboxylic acid groups, carboxylic anhydride groups, carboxylic ester groups and mixtures of these,
  where component B) has been neutralized to an extent of at least 20% with alkali metal ions, based on 100% by weight of A) and B), and
  C) from 0 to 70% by weight of other additional substances, where the sum of the % by weight values for A) to C) is 100%,
for use in the production of cable sheathing or optical-conductor sheathing via blow molding, profile extrusion, and/or pipe extrusion.

7 Claims, 2 Drawing Sheets

(56) References Cited

FOREIGN PATENT DOCUMENTS

| | | |
|---|---|---|
| DE | 3506472 A1 | 8/1986 |
| DE | 4401055 A1 | 7/1995 |
| DE | 19745921 A1 | 4/1999 |
| DE | 10054859 A1 | 5/2002 |
| EP | 0208187 A2 | 1/1987 |
| EP | 0365916 A1 | 5/1990 |
| EP | 0711810 A1 | 5/1996 |
| EP | 0791606 A2 | 8/1997 |
| EP | 1353986 A2 | 10/2003 |
| EP | 1722984 A1 | 11/2006 |
| EP | 2 976 385 A1 | 1/2016 |
| JP | S58147902 A | 9/1983 |
| JP | 2012041516 * | 3/2012 |
| WO | WO-99/20452 A1 | 4/1999 |
| WO | WO-2006/104821 A1 | 10/2006 |
| WO | WO-2011/099486 A1 | 8/2011 |
| WO | WO-2014/146912 A1 | 9/2014 |

OTHER PUBLICATIONS

Schildknecht, C. E., "Vinyl and Related Polymers," John Wiley & Sons Inc.(1952), pp. 484-494.
International Search Report for PCT Patent Application No. PCT/EP2017/071535, dated Sep. 21, 2017.

* cited by examiner

POLYESTER FOR PROFILE EXTRUSION AND/OR PIPE EXTRUSION

CROSS-REFERENCE TO RELATED APPLICATIONS

This is U.S. national phase of International Application No. PCT/EP2017/071535, filed Aug. 28, 2017, which claims the benefit of European Patent Application No. 16188762.5, filed Sep. 14, 2016.

The invention relates to the use of thermoplastic molding compositions comprising, as essential components,
A) from 29 to 99.99% by weight of a polyester,
B) from 0.01 to 10% by weight of an ionomer composed of at least one copolymer of
   $B_1$) from 30 to 99.9% by weight of ethylene
   $B_2$) from 0 to 60% by weight of 1-octene or 1-butene or propylene or a mixture of these and
   $B_3$) from 0.01 to 70% by weight of functional monomers, where the functional monomers are selected from the group of the carboxylic acid groups, carboxylic anhydride groups, carboxylic ester groups and mixtures of these,
where component B) has been neutralized to an extent of at least 20% with alkali metal ions,
based on 100% by weight of A) and B), and also moreover
C) from 0 to 70% by weight of other additional substances, where the sum of the % by weight values for A) to C) is 100%,
for the production of cable sheathing or optical-conductor sheathing via blow molding, profile extrusion and/or pipe extrusion.

The invention further relates to cable sheathing or optical-conductor sheathing obtainable via blow molding, profile extrusion and/or pipe extrusion.

Such components B) are well known as impact modifiers for thermoplastics. The suitability of such compounded materials for cable sheathing etc. has not been investigated.

Criteria for suitability as cable sheathing and optical-conductor sheathing are known by way of example from WO99/20452, which uses a specifically produced polyester with defined melt behavior.

Sheathing of optical conductors requires a high-stiffness thermoplastic which has good extrudability and exhibits particularly rapid solidification, mostly polybutylene terephthalate of particularly high molecular weight. Another particularly suitable material is a talc-nucleated PBT which, by virtue of particularly rapid crystallization, can provide high throughput rates and good properties of the finished cable. The sheathing is achieved via a process in which one or more glass fibers are sheathed at rates of up to 800 m/min by sheathing extruded by means of an annular die. The prior art here is introduction of a polyolefin gel between glass fiber and polyester sheathing, directly at the annular die, for further protection of the glass fiber. The resultant sheathing is a thin-walled tube (wall thickness typically from 0.05 mm to 2 mm) of small diameter (from 0.5 to 6 mm), produced in very great lengths (several km) in a continuous extrusion process. One of the factors determining the diameter and wall thickness of the sheathing is the number of glass-fiber conductors used (currently up to 144). The sheathing protects the enclosed glass fibers from exterior effects such as mechanical loads (buckling and torsion) and contamination.

Features of an efficient production process for the sheathing are that the PBT can provide high extrusion take-off rate, while producing a tube with excellent circular cross section and uniform wall thickness, very good mechanical properties, and very good surface quality.

WO 2014/146912 discloses polyester molding compositions which are suitable for optical conductors, where these comprise inorganic alkali metal salts at relatively high concentration. Such molding compositions are disadvantageous during processing, because the ester bonds are cleaved by the basic groups (polymer degradation), and alkali metal carbonates cause foaming at the die, which during processing leads to deposits on the die, which in turn can lead to formation of surface defects on the cable sheathing.

JP-A1982/0029159 discloses sheathing which is suitable for metal wires and is composed of ethylene copolymers which bear acidic groups and which lead to the same disadvantages during processing.

It was therefore an object of the present invention to provide polyester molding compositions which comply with criteria such as high stiffness, strength, low water absorption, and rapid crystallization, and which in particular comply with the abovementioned criteria for processability in blow molding, profile extrusion and/or pipe extrusion to give cable sheathing and/or optical-conductor sheathing.

The use defined in the introduction has accordingly been found. Preferred embodiments can be found in the dependent claims.

The molding compositions of the invention comprise, as component A), from 29 to 99.99% by weight, preferably from 89 to 99.9% by weight and in particular from 92 to 99.5% by weight, of at least one thermoplastic polyester, based on components A) and B).

At least one of the polyesters in component A) is a semicrystalline polyester. Preference is given to components A) which comprise at least 50% by weight of semicrystalline polyesters. This proportion is particularly preferably 70% by weight (based in each case on 100% by weight of A)).

Based on 100% of the molding compositions made of A) to C) (i.e. inclusive of C)), these comprise
from 30 to 100% by weight of A)+B), preferably from 50 to 100, and
from 0 to 70% by weight of C), preferably from 0 to 50, in particular from 0 to 10% by weight.

An essential element of the above proportions is that the proportion of component B) is always based on the polyester, because this proportional relationship is intended to be within the limits mentioned.

Polyesters A) used are generally those based on aromatic dicarboxylic acids and on an aliphatic or aromatic dihydroxy compound.

Preferred dicarboxylic acids that may be mentioned are 2,6-naphthalenedicarboxylic acid, terephthalic acid and isophthalic acid and mixtures of these. Up to 30 mol %, preferably not more than 10 mol %, of the aromatic dicarboxylic acids can be replaced by aliphatic or cycloaliphatic dicarboxylic acids such as adipic acid, azelaic acid, sebacic acid, dodecanedioic acids and cyclohexanedicarboxylic acids.

Among the aliphatic dihydroxy compounds, preference is given to diols having from 2 to 6 carbon atoms, in particular 1,2-ethanediol, 1,3-propanediol, 1,4-butanediol, 1,6-hexanediol, 1,4-hexanediol, 1,4-cyclohexanediol, 1,4-cyclohexanedimethanol and neopentyl glycol and mixtures of these.

A first group of preferred polyesters is provided by polyalkylene terephthalates, in particular those having from 2 to 10 C atoms in the alcohol moiety.

Such polyalkylene terephthalates are known per se and are described in the literature. They comprise, in the main chain, an aromatic ring which derives from the aromatic dicarboxylic acid.

The aromatic ring can also have substitution, e.g. by halogen such as chlorine and bromine or by $C_1$-$C_4$-alkyl groups such as methyl groups, ethyl groups, isopropyl groups, n-propyl groups, or n-, iso- or tert-butyl groups.

These polyalkylene terephthalates can be produced by reaction of aromatic dicarboxylic acids, esters of these or other ester-forming derivatives with aliphatic dihydroxy compounds in a manner known per se.

Polyesters (A) that may be mentioned as particularly preferred are polyalkylene terephthalates which derive from alkanediols having from 2 to 6 C atoms. Among these, preference is in particular given to polyethylene terephthalate, polypropylene terephthalate and polybutylene terephthalate and mixtures of these. Preference is further given to PET and/or PBT which comprise up to 1% by weight, preferably up to 0.75% by weight, of 1,6-hexanediol and/or 2-methyl-1,5-pentanediol as other monomer units.

The intrinsic viscosity of the polyesters (A) is generally in the range from 50 to 220 ml/g, preferably at least 140 ml/g, in particular at least 145 ml/g (measured in 0.5% by weight solution in a phenol/o-dichlorobenzene mixture (ratio by weight 1:1) at 25° C. in accordance with ISO 1628).

Preference is in particular given to polyesters having from 0 to 100 meq/kg carboxy end group content, preferably from 10 to 50 meq/kg and in particular from 15 to 40 meq/kg of polyester. Such polyesters can be produced by way of example by the process of DE-A 44 01 055. Carboxy end group content is usually determined by titration methods (e.g. potentiometry).

Molding compositions that are in particular preferred comprise, as component A), a mixture of polyesters where at least one is PBT. The proportion by way of example of the polyethylene terephthalate in the mixture is preferably up to 50% by weight, in particular from 10 to 35% by weight, based on 100% by weight of A).

It is moreover advantageous to use PET recyclates (also termed scrap PET), optionally in a mixture with polyalkylene terephthalates such as PBT.

The term recyclates generally means:

1) Material known as post-industrial recyclate: this involves production wastes from polycondensation or from processing, for example sprues from injection molding, start-up material from injection molding or extrusion, or edge off-cuts from extruded sheets or films.

2) Post-consumer recyclate: this involves plastics items which are collected and treated after utilization by the end consumer. Blow-molded PET bottles for mineral water, soft drinks and juices are easily the predominant items in terms of quantity.

Both types of recyclate may take the form either of regrind or of pellets. In the latter case, the crude recyclates are isolated and purified and then melted and pelletized using an extruder.

This usually facilitates handling and free-flowing properties, and metering capability for further stages of processing.

The recyclates used may take the form either of regrind or of pellets, and maximal edge length here should be 10 mm, preferably less than 8 mm.

Because polyesters undergo hydrolytic cleavage during processing (due to traces of moisture), it is advisable to predry the recyclate. Residual moisture content after drying is preferably <0.2%, in particular <0.05%.

Another group to be mentioned is that of fully aromatic polyesters deriving from aromatic dicarboxylic acids and aromatic dihydroxy compounds.

Suitable aromatic dicarboxylic acids are the compounds previously described for the polyalkylene terephthalates. The mixtures preferably used are composed of from 5 to 100 mol % of isophthalic acid and from 0 to 100 mol % of terephthalic acid, in particular from about 80% of terephthalic acid with 20% of isophthalic acid.

The aromatic dihydroxy compounds preferably have the general formula where Z is an alkylene or cycloalkylene group having up to 8 carbon atoms, an arylene group having up to 12 carbon atoms, a carbonyl group, a sulfonyl group, an oxygen atom or a sulfur atom, or a chemical bond, and where m is from 0 to 2. The phenylene groups of the compounds may also have substitution by $C_1$-$C_6$-alkyl or alkoxy groups, and fluorine, chlorine or bromine.

Examples of parent compounds for these compounds are dihydroxybiphenyl,
di(hydroxyphenyl)alkane,
di(hydroxyphenyl)cycloalkane,
di(hydroxyphenyl) sulfide,
di(hydroxyphenyl) ether,
di(hydroxyphenyl) ketone,
di(hydroxyphenyl) sulfoxide,
α,α'-di(hydroxyphenyl)dialkylbenzene,
di(hydroxyphenyl) sulfone, di(hydroxybenzoyl)benzene,
resorcinol, and hydroquinone, and also the ring-alkylated and ring-halogenated derivatives of these.

Among these preference is given to
4,4'-dihydroxybiphenyl,
2,4-di(4'-hydroxyphenyl)-2-methylbutane,
α,α'-di(4-hydroxyphenyl)-p-diisopropylbenzene,
2,2-di(3'-methyl-4'-hydroxyphenyl)propane, and
2,2-di(3'-chloro-4'-hydroxyphenyl)propane,
and in particular to
2,2-di(4'-hydroxyphenyl)propane,
2,2-di(3',5-dichlorodihydroxyphenyl)propane,
1,1-di(4'-hydroxyphenyl)cyclohexane,
3,4'-dihydroxybenzophenone,
4,4'-dihydroxydiphenyl sulfone, and
2,2-di(3',5'-dimethyl-4'-hydroxyphenyl)propane
and mixtures of these.

It is, of course, also possible to use mixtures of polyalkylene terephthalates and fully aromatic polyesters. These generally comprise from 20 to 98% by weight of the polyalkylene terephthalate and from 2 to 80% by weight of the fully aromatic polyester.

It is, of course, also possible to use polyester block copolymers, such as copolyetheresters. Products of this type are known per se and are described in the literature, e.g. in U.S. Pat. No. 3,651,014. Corresponding products are also available commercially, e.g. Hytrel® (DuPont).

According to the invention, the term polyesters also includes halogen-free polycarbonates. Examples of suitable halogen-free polycarbonates are those based on diphenols of the general formula where Q is a single bond, a $C_1$-$C_8$-alkylene group, a $C_2$-$C_3$-alkylidene group, a $C_3$-$C_6$-cycloalkylidene group, a $C_6$-$C_{12}$-arylene group, or —O—, —S— or —$SO_2$—, and m is an integer from 0 to 2.

The phenylene radicals of the diphenols may also have substituents, such as $C_1$-$C_6$-alkyl or $C_1$-$C_6$-alkoxy.

Examples of preferred diphenols of the formula are hydroquinone, resorcinol, 4,4'-dihydroxybiphenyl, 2,2-bis(4-hydroxyphenyl)propane, 2,4-bis(4-hydroxyphenyl)-2-methylbutane and 1,1-bis(4-hydroxyphenyl)cyclohexane. Particular preference is given to 2,2-bis(4-hydroxyphenyl)propane and 1,1-bis(4-hydroxyphenyl)cyclohexane, and also to 1,1-bis(4-hydroxyphenyl)-3,3,5-trimethylcyclohexane.

Either homopolycarbonates or copolycarbonates are suitable as component A), and preference is given to the copolycarbonates of bisphenol A, as well as to bisphenol A homopolymer.

Suitable polycarbonates may be branched in a known manner, specifically and preferably by incorporating 0.05 to 2.0 mol %, based on the total of the diphenols used, of at least trifunctional compounds, for example those having three or more phenolic OH groups.

Polycarbonates which have proven particularly suitable have relative viscosities $\eta_{rel}$ of from 1.10 to 1.50, in particular from 1.25 to 1.40. This corresponds to average molar masses $M_w$ (weight-average) of from 10 000 to 200 000 g/mol, preferably from 20 000 to 80 000 g/mol.

The diphenols of the general formula are known per se or can be produced by known processes.

The polycarbonates may, for example, be produced by reacting the diphenols with phosgene in the interfacial process, or with phosgene in the homogeneous-phase process (known as the pyridine process), and in each case the desired molecular weight is achieved in a known manner by using an appropriate amount of known chain terminators. (In relation to polydiorganosiloxane-containing polycarbonates see, for example, DE-A 33 34 782.) Examples of suitable chain terminators are phenol, p-tert-butylphenol, or else long-chain alkylphenols, such as 4-(1,3-tetramethylbutyl) phenol as in DE-A 28 42 005, or monoalkylphenols, or dialkylphenols with a total of from 8 to 20 carbon atoms in the alkyl substituents as in DE-A 35 06 472, such as p-nonylphenol, 3,5-di-tert-butylphenol, p-tert-octylphenol, p-dodecylphenol, 2-(3,5-dimethylheptyl)phenol and 4-(3,5-dimethylheptyl)phenol.

For the purposes of the present invention, halogen-free polycarbonates are polycarbonates composed of halogen-free diphenols, of halogen-free chain terminators and optionally of halogen-free branching agents, where the content of subordinate amounts at the ppm level of hydrolyzable chlorine resulting, for example, from the production of the polycarbonates with phosgene in the interfacial process, is not regarded as meriting the term halogen-containing for the purposes of the invention. Polycarbonates of this type with contents of hydrolyzable chlorine at the ppm level are halogen-free polycarbonates for the purposes of the present invention.

Other suitable components A) which may be mentioned are amorphous polyester carbonates, where during the production process phosgene has been replaced by aromatic dicarboxylic acid units, such as isophthalic acid and/or terephthalic acid units. Reference may be made at this point to EP-A 711 810 for further details.

EP-A 365 916 describes other suitable copolycarbonates having cycloalkyl moieties as monomer units.

The molding compositions of the invention comprise, as component B), from 0.01 to 10% by weight, preferably from 0.1 to 7% by weight, and in particular from 0.5 to 5% by weight, based on 100% by weight of A)+B)+C, of an ionomer composed of at least one copolymer of $B_1$) from 30 to 99.9% by weight of ethylene $B_2$) from 0 to 60% by weight of 1-octene or 1-butene or propylene or a mixture of these and $B_3$) from 0.01 to 70% by weight of functional monomers, where the functional monomers are selected from the group of the carboxylic acid groups, carboxylic anhydride groups, carboxylic ester groups and mixtures of these, where component B) has been neutralized to an extent of at least 20% with alkali metal ions, preferably has been neutralized with alkali metal ions to an extent of at least 35%, in particular to an extent of at least 50%.

Preferred alkali metal ions are sodium, potassium or a mixture of these.

The percentage proportion of neutralization is determined by flame AA spectrometer (Shimadzu SpectrAA-7000), atomic absorption spectrometry=AAS.

The term ionomer means according to Rompp Online Lexikon [Rompp's on-line encyclopedia], Georg Thieme Verlag, August 2008, ionic polymers which comprise large proportions of hydrophobic monomers and mostly small proportions of comonomers bearing ionic groups.

These are obtainable by direct copolymerization, and are reacted in a subsequent reaction (for example with alkali metal hydroxide solutions) to give salts.

Preferred components $B_3$) are composed of an ethylenically unsaturated mono- or dicarboxylic acid, or a functional derivative of such an acid.

Such preferred components $B_3$) are composed of acrylic acid, methacrylic acid, maleic anhydride, maleic acid, or fumaric acid, or of a (meth)acrylate having from 1 to 18 C atoms.

In principle, all primary, secondary and tertiary $C_1$-$C_{15}$-alkyl esters of acrylic acid or methacrylic acid are suitable, but preference is given to esters having from 1 to 12 C atoms, in particular having from 2 to 10 C atoms.

Examples here are methyl, ethyl, propyl, n-butyl, isobutyl, tert-butyl, 2-ethylhexyl, octyl and decyl acrylates and the corresponding esters of methacrylic acid. Among these, particular preference is given to n-butyl acrylate and 2-ethylhexyl acrylate.

The olefin polymers can comprise, instead of the esters or in addition thereto, monomers having latently acid-functional monomers of ethylenically unsaturated mono or dicarboxylic acids.

The following may be mentioned here as examples of monomers $B_3$): tertiary alkyl esters of acrylic acid or methacrylic acid, in particular tert-butyl acrylate, tert-butyl methacrylate, and dicarboxylic acid derivatives such as monoesters of maleic acid and fumaric acid and derivatives of these acids.

The expression latently acid-functional monomers means compounds which, under the polymerization conditions or during the incorporation of the olefin polymers into the molding compositions, form free acid groups.

Preferred components B) are those where component B) is composed of $B_1$) from 35 to 89.95% by weight, preferably from 40 to 89.9% by weight, of ethylene $B_2$) from 10 to 60% by weight, preferably from 10 to 30% by weight, of 1-octene or 1-butene or propylene or a mixture of these and $B_3$) from 0.05 to 50% by weight, preferably from 0.1 to 30% by weight, of functional monomers according to claim 1.

In particular, preferred components B) are those where component B) is composed of $B_1$) from 50 to 98% by weight, preferably from 80 to 97% by weight, of ethylene $B_2$) from 0 to 50% by weight of 1-octene or 1-butene or propylene or a mixture of these and $B_3$) from 2 to 50% by weight, preferably from 3 to 20% by weight, of functional monomers according to claim 1.

The ethylene copolymers described can be produced by processes known per se, preferably by random copolymerization under high pressure and at elevated temperature.

The melt index of the ethylene copolymers is generally in the range from 1 to 80 g/10 min (measured at 190° C. with 2.16 kg load).

The molar mass of these ethylene-α-olefin copolymers is from 10 000 to 500 000 g/mol, preferably from 15 000 to 400 000 g/mol (Mn, determined by means of GPC in 1,2,4-trichlorobenzene with PS calibration).

A particular embodiment uses ethylene-α-olefin copolymers produced by means of what are known as single-site catalysts. Further details can be found in U.S. Pat. No. 5,272,236. In this case, the polydispersity of the ethylene-α-olefin copolymers is narrow for polyolefins, being less than 4, preferably less than 3.5.

The molding compositions of the invention can comprise, based on 100% by weight of A), B) and C), as component C), from 0 to 70% by weight, in particular up to 50% by weight, of other additional substances and processing aids, these being different from B) and/or A).

Examples of conventional additional substances C) are quantities of up to 40% by weight, preferably up to 15% by weight, of elastomeric polymers (often also termed impact modifiers, elastomers or rubbers).

Examples of impact modifiers are rubbers, which can have functional groups. It is also possible to use mixtures of two or more different impact-modifying rubbers.

Rubbers which increase the toughness of the molding compositions generally comprise elastomeric content with glass transition temperature below −10° C., preferably below −30° C., and they comprise at least one functional group which can react with the polyamide. Examples of suitable functional groups are carboxylic acid groups, carboxylic anhydride groups, carboxylic ester groups, carboxamide groups, carboximide groups, amino groups, hydroxy groups, epoxy groups, urethane groups and oxazoline groups, preferably carboxylic anhydride groups.

Among the preferred functionalized rubbers are functionalized polyolefin rubbers composed of the following components:

1. from 40 to 99% by weight of at least one alpha-olefin having from 2 to 8 C atoms,
2. from 0 to 50% by weight of a diene,
3. from 0 to 45% by weight of a $C_1$-$C_{12}$-alkyl ester of acrylic acid or methacrylic acid or a mixture of such esters,
4. from 0 to 40% by weight of an ethylenically unsaturated $C_2$-$C_{20}$-mono- or dicarboxylic acid or of a functional derivative of such an acid,
5. from 0 to 40% by weight of a monomer comprising epoxy groups, and
6. from 0 to 5% by weight of other monomers polymerizable by a free-radical route, where the entirety of components 3) to 5) amounts to at least from 1 to 45% by weight, based on components 1) to 6).

Examples that may be mentioned of suitable alpha-olefins are ethylene, propylene, 1-butylene, 1-pentylene, 1-hexylene, 1-heptylene, 1-octylene, 2-methylpropylene, 3-methyl-1-butylene and 3-ethyl-1-butylene, preference being given here to ethylene and propylene.

Suitable diene monomers that may be mentioned are conjugated dienes having from 4 to 8 C atoms, for example isoprene and butadiene, unconjugated dienes having from 5 to 25 C atoms, for example penta-1,4-diene, hexa-1,4-diene, hexa-1,5-diene, 2,5-dimethylhexa-1,5-diene and octa-1,4-diene, cyclic dienes, for example cyclopentadiene, cyclohexadienes, cyclooctadienes and dicyclopentadiene, and also alkenylnorbornene, for example 5-ethylidene-2-norbornene, 5-butylidene-2-norbornene, 2-methallyl-5-norbornene, 2-isopropenyl-5-norbornene and tricyclodienes, for example 3-methyltricyclo[5.2.1.0.2.6]deca-3,8-diene, and mixtures of these. Preference is given to hexa-1,5-diene, 5-ethylidenenorbornen and dicyclopentadiene.

Diene content is preferably from 0.5 to 50% by weight, in particular from 2 to 20% by weight and particularly preferably from 3 to 15% by weight, based on the total weight of the olefin polymer. Examples of suitable esters are methyl, ethyl, propyl-, n-butyl, isobutyl and 2-ethylhexyl, octyl and decyl acrylates and the corresponding esters of methacrylic acid. Among these, particular preference is given to methyl, ethyl, propyl, n-butyl and 2-ethylhexyl acrylate and the corresponding methacrylates.

It is also possible that the olefin polymers comprise, instead of the esters or in addition thereto, acid-functional and/or latently acid-functional monomers of ethylenically unsaturated mono- or dicarboxylic acids.

Examples of ethylenically unsaturated mono- or dicarboxylic acids are acrylic acid, methacrylic acid, tertiary alkyl esters of these acids, in particular tert-butyl acrylate, and dicarboxylic acids such as maleic acid and fumaric acid, and derivatives of these acids, and also monoesters thereof.

The expression latently acid-functional monomers means compounds which, under the polymerization conditions or during the incorporation of the olefin polymers into the molding compositions, form free acid groups. Examples that may be mentioned here are anhydrides of dicarboxylic acids having from 2 to 20 C atoms, in particular maleic anhydride, and tertiary $C_1$-$C_{12}$-alkyl esters of the abovementioned acids, in particular tert-butyl acrylate and tert-butyl methacrylate.

Examples of other monomers that can be used are vinyl esters and vinyl ethers.

Particular preference is given to olefin polymers of from 50 to 98.9% by weight, in particular from 60 to 94.85% by weight, of ethylene and from 1 to 50% by weight, in particular from 5 to 40% by weight, of an ester of acrylic or methacrylic acid, and from 0.1 to 20.0% by weight, in particular from 0.15 to 15% by weight, of glycidyl acrylate and/or glycidyl methacrylate, acrylic acid and/or maleic anhydride.

Particularly suitable functionalized rubbers are ethylene-methyl methacrylate-glycidyl methacrylate polymers, ethylene-methyl acrylate-glycidyl methacrylate polymers, ethylene-methyl acrylate-glycidyl acrylate polymers and ethylene-methyl methacrylate-glycidyl acrylate polymers.

The polymers described above can be produced by processes known per se, preferably by random copolymerization under high pressure and at elevated temperature.

The melt index of these copolymers is generally in the range from 1 to 80 g/10 min (measured at 190° C. and 2.16 kg load).

Another group of suitable rubbers that should be mentioned is provided by core-shell graft rubbers. These are graft rubbers produced in emulsion and consisting of at least one hard and one soft constituent. The expression hard constituent usually means a polymer with glass transition temperature at least 25° C., and the expression soft constituent usually means a polymer with glass transition temperature no higher than 0° C. These products have a structure made of a core and of at least one shell, and the structure here results from the sequence of addition of the monomers. The soft constituents generally derive from butadiene, isoprene, alkyl acrylates, alkyl methacrylates or siloxanes and optionally other comonomers. Suitable siloxane cores can by way of example be produced by starting from cyclic oligomeric octamethyltetra-siloxane or tetravinyltetramethyltetrasiloxane. These can by way of example be reacted with gamma-mercaptopropylmethyldimethoxysilane in a ring-opening cationic polymerization reaction, preferably in the presence of sulfonic acids, to give the soft siloxane cores. The siloxanes can also be crosslinked by, for example, carrying out the polymerization reaction in the presence of silanes having hydrolyzable groups such as halogen or alkoxy groups, an example being tetraethoxysilane, methyltrimethoxysilane or phenyltrimethoxysilane. Suitable comonomers that should be mentioned here are by way of example styrene, acrylonitrile and crosslinking or graft-active monomers having more than one polymerizable double bond, for example diallyl phthalate, divinylbenzene, butanediol diacrylate or triallyl (iso)cyanurate. The hard constituents generally derive from styrene, alpha-methylstyrene and copolymers of these, and comonomers that should be listed here are preferably acrylonitrile, methacrylonitrile and methyl methacrylate.

Preferred core-shell graft rubbers comprise a soft core and a hard shell, or a hard core, a first soft shell and at least one other shell which is hard. Incorporation of functional groups, for example carbonyl, carboxylic acid, anhydride, amide, imide, carboxylic ester, amino, hydroxy, epoxy, oxazoline, urethane, urea, lactam or halobenzyl groups is preferably achieved here via addition of suitably functionalized monomers during the polymerization of the final shell.

Examples of suitable functionalized monomers are maleic acid, maleic anhydride, mono- or diesters of maleic acid, tertiary-butyl (meth)acrylate, acrylic acid, glycidyl (meth)acrylate and vinyloxazoline. The proportion of monomers having functional groups is generally from 0.1 to 25% by weight, preferably from 0.25 to 15% by weight, based on the total weight of the core-shell graft rubber. The ratio by weight of soft to hard constituents is generally from 1:9 to 9:1, preferably from 3:7 to 8:2.

Such rubbers are known per se and are described by way of example in EP-A-0 208 187. The incorporation of oxazine groups for functionalization can be achieved by way of example as in EP-A-0 791 606.

Another group of suitable impact modifiers is provided by thermoplastic polyester elastomers.

The expression polyester elastomers here means segmented copolyetheresters which comprise long-chain segments that generally derive from poly(alkylene) ether glycols and short-chain segments that derive from low-molecular-weight diols and dicarboxylic acids. Such products are known per se and are described in the literature, e.g. in U.S. Pat. No. 3,651,014. Corresponding products are also available commercially as Hytrel™ (Du Pont), Arnitel™ (Akzo) and Pelprene™ (Toyobo Co. Ltd.).

Mixtures of various rubbers can, of course, also be used.

Fibrous or particulate fillers C) that may be mentioned are glass fibers, glass beads, amorphous silica, asbestos, calcium silicate, calcium metasilicate, magnesium carbonate, kaolin, chalk, powdered quartz, mica, barium sulfate and feldspar. Quantities used of fibrous fillers C) are up to 60% by weight, in particular up to 35% by weight, and quantities used of particulate fillers are up to 30% by weight, in particular up to 10% by weight.

Aramid fibers and potassium titanate fibers may be mentioned as preferred fibrous fillers, particular preference being given here to glass fibers in the form of E glass. These can be used in the form of rovings or chopped glass in the forms commercially available.

Quantities preferably used of strongly laser-absorbing fillers such as carbon fibers, carbon black, graphite, graphene or carbon nanotubes are preferably below 1% by weight, particularly preferably below 0.05% by weight.

The fibrous fillers can have been surface-pretreated with a silane compound in order to improve compatibility with the thermoplastic.

Suitable silane compounds are those of the general formula where the substituents are defined as follows:
X NH$_2$—, HO—,
n is an integer from 2 to 10, preferably from 3 to 4
m is an integer from 1 to 5, preferably from 1 to 2
k is an integer from 1 to 3, preferably 1.

Preferred silane compounds are aminopropyltrimethoxysilane, aminobutyltrimethoxysilane, aminopropyltriethoxysilane, aminobutyltriethoxysilane, and also the corresponding silanes which comprise a glycidyl group as substituent X.

Quantities generally used of the silane compounds for surface-coating are from 0.05 to 5% by weight, preferably from 0.1 to 1.5% by weight and in particular from 0.2 to 0.5% by weight (based on C)).

Acicular mineral fillers are also suitable.

For the purposes of the invention, the expression acicular mineral fillers means mineral fillers with distinctly acicular character. Acicular wollastonite may be mentioned as an example. The L/D (length/diameter) ratio of the mineral is preferably from 8:1 to 35:1, with preference from 8:1 to 11:1. The mineral filler can optionally have been pretreated with the abovementioned silane compounds; however, the pretreatment is not essential.

The thermoplastic molding compositions of the invention can comprise, as component C), conventional processing aids such as stabilizers, oxidation retarders, agents to inhibit decomposition by heat and decomposition by ultraviolet light, lubricants and mold-release agents, nucleating agents such as sodium phenylphosphinate, aluminum oxide, silicon dioxide, nylon 22, and also colorants such as dyes and pigments, or plasticizers, etc.

The molding compositions of the invention comprise, as preferred nucleating agent C), from 0 to 5% by weight of talc. If this is used, quantities preferably used thereof are from 0.001 to 4% by weight, in particular from 0.01 to 1% by weight.

Talc is a hydrated magnesium silicate of composition $Mg_3[(OH)_2/Si_4O_{10}]$ or $3 MgOx4SiO_2xH_2O$. These materials known as three-layer phyllosilicates have a triclinic, monoclinic or rhombic crystal structure with lamellar habit. Other trace elements that can be present are Mn, Ti, Cr, Ni, Na, and K, where the OH group can have been replaced by fluoride.

It is particularly preferable to use talc with 100% of its particle sizes smaller than 20 µm. The particle size distribution is usually determined by sedimentation analysis, and is preferably <20 µm: 100% by weight, <10 µm: 99% by weight, <5 µm: 85% by weight, <3 µm: 60% by weight, <2 µm: 43% by weight. Such products are obtainable commercially as Micro-Talc I.T. extra.

Examples of oxidation retarders and heat stabilizers are sterically hindered phenols and/or phosphites, hydroquinones, aromatic secondary amines such as diphenylamines, various substituted members of these groups and mixtures thereof in concentrations up to 1% by weight, based on the weight of the thermoplastic molding compositions.

UV stabilizers that may be mentioned, quantities used of which are generally up to 2% by weight, based on the molding composition, are various substituted resorcinols, salicylates, benzotriazoles and benzophenones.

Colorants that can be added are inorganic and organic pigments, and also dyes, for example nigrosine and anthraquinones. Examples of particularly suitable colorants are mentioned in EP 1722984 B1, EP 1353986 B1 or DE 10054859 A1.

Preference is further given to esters or amides of saturated or unsaturated aliphatic carboxylic acids having from 10 to 40, preferably from 16 to 22 C atoms with saturated aliphatic alcohols or with amines having from 2 to 40, preferably from 2 to 6 C atoms.

The carboxylic acids can be monobasic or dibasic. Examples that may be mentioned are pelargonic acid, palmitic acid, lauric acid, margaric acid, dodecanedioic acid, behenic acid, and particularly preferably stearic acid, capric acid, and also montanic acid (a mixture of fatty acids having from 30 to 40 C atoms).

The aliphatic alcohols can be mono- to tetrahydric. Examples of alcohols are n-butanol, n-octanol, stearyl alcohol, ethylene glycol, propylene glycol, neopentyl glycol, and pentaerythritol, preference being given here to glycerol and pentaerythritol.

The aliphatic amines can be mono- to trifunctional. Examples here are stearylamine, ethylenediamine, propylenediamine, hexamethylenediamine, and di(6-aminohexyl) amine, particular preference being given here to ethylenediamine and hexamethylenediamine.

Preferred esters or amides are correspondingly glycerol distearate, glycerol tristearate, ethylenediamine distearate, glycerol monopalmitate, glycerol trilaurate, glycerol monobehenate and pentaerythritol tetrastearate.

It is also possible to use mixtures of various esters or amides or esters with amides in combination, in any desired mixing ratio.

Quantities usually used of other lubricants and mold-release agents are generally up to 1% by weight. Preference is given here to long-chain fatty acids (e.g. stearic acid or behenic acid), salts thereof (e.g. Ca stearate or Zn stearate) or montan waxes (mixtures of straight-chain, saturated carboxylic acids having chain lengths of from 28 to 32 C atoms), and also Ca montanate or Na montanate, and also low-molecular-weight polyethylene waxes or low-molecular-weight polypropylene waxes.

The following may be mentioned as examples of plasticizers: dioctyl phthalate, dibenzyl phthalate, butyl benzyl phthalate, hydrocarbon oils, and N-(n-butyl)benzenesulfonamide.

The molding compositions of the invention can also comprise from 0 to 2% by weight of fluorine-containing ethylene polymers. These are polymers of ethylene with from 55 to 76% by weight fluorine content, preferably from 70 to 76% by weight.

Examples here are polytetrafluoroethylene (PTFE), tetrafluoroethylene-hexafluoropropylene copolymers and tetrafluoroethylene copolymers with relatively small proportions (generally up to 50% by weight) of copolymerizable ethylenically unsaturated monomers. These are described by way of example by Schildknecht in "Vinyl and Related Polymers", Wiley-Verlag, 1952, pp. 484 to 494 and by Wall in "Fluoropolymers" (Wiley Interscience, 1972).

These fluorine-containing ethylene polymers are present in homogeneous distribution in the molding compositions, their $d_{50}$ particle size (number-average) preferably being from 0.05 to 10 µm, in particular from 0.1 to 5 µm. These low particle sizes can particularly preferably be achieved by using aqueous dispersions of fluorine-containing ethylene polymers and incorporating these into a polyester melt.

The thermoplastic molding compositions of the invention can be produced by processes known per se, by mixing the starting components in conventional mixing devices such as screw-based extruders, Brabender mixers or Banbury mixers, and then extruding the material. The extrudate can be cooled and comminuted. It is also possible to premix individual components (e.g. application, in a drum or by other methods, of component B) onto the pellets), and then to add the remaining starting materials individually and/or likewise in mixed form. The mixing temperatures are generally from 230 to 290° C. In another preferred method, component B) can be added as hot feed or directly into the extruder intake.

In another preferred mode of operation, it is possible to mix, compound and pelletize components B), and also optionally C) with a polyester prepolymer. The resultant pellets are then condensed in the solid phase continuously or batchwise under inert gas at a temperature below the melting point of A) until the desired viscosity has been reached.

Another preferred production method begins by producing a masterbatch (concentrate) from A) and B), the quantity incorporated into A) of component B) here being up to 30% by weight, preferably up to 10% by weight (based on A)+B)). This concentrate in the form of pellets (known as dry blend) is fed into the polyester (without additional substances) during the production of the pipe extrudates or profile extrudates, or is premixed in the corresponding quantitative proportion, e.g. in a tumbling mixer, and the pellet mixture is then used for pipe extrusion or cable extrusion.

The molding compositions that can be used in the invention are suitable for the production of moldings by means of blow molding, profile extrusion and pipe extrusion, to give cable sheathing and/or optical-conductor sheathing, because they provide high stiffness/strength, low water absorption, rapid crystallization and good processability.

Such moldings have advantages in compressive strength, buckling resistance and hydrolysis resistance.

EXAMPLES

Component A:
Polybutylene terephthalate with viscosity 160 ml/g and carboxy end group content 34 meq/kg+(Ultradur® B 6550 from BASF SE) (IV measured in 0.5% by weight solution in phenol/o-dichlorobenzene, 1:1 mixture, at 25° C. in accordance with ISO 1628), with melt volume rate MVR 9.5 $cm^3$/10 min (measured in accordance with ISO 1133 at 250° C. with 2.16 kg load).

Component B/1
AClyn® 285 P from Honeywell International Inc.:
An ionomer of an ethylene-acrylic acid copolymer which has been neutralized to an extent of 80% with sodium ions. Acrylic acid content is 15%.

Component B/2
A maleic anhydride-diisobutylene copolymer with molar mass 12 000 g/mol (determined by GPC). The product has been partially neutralized (75%) with NaOH, and its pH in aqueous solution is 11.5.

Component C/1
Talc

Component C/2
Ca stearate

Component B1comp
Sodium Carbonate

The molding compositions were produced in a ZSK25 with flat temperature profile at from 260 to 275° C. and subsequent pelletization. Metering of the additives was achieved here together with the pellets in the cold feed system.

TABLE 1

Compositions

| Component [% by wt.] | comp1 [% by wt.] | comp2 [% by wt.] | Ex. (1) [% by wt.] | Ex. (2) [% by wt.] | Ex. (3) [% by wt.] | Ex. (4) [% by wt.] |
| --- | --- | --- | --- | --- | --- | --- |
| A | 99.9 | 99.6 | 99 | 97 | 99 | 97 |
| B/1 | — | — | 1 | 3 | — | — |
| B/2 | — | — | — | — | 1 | 3 |
| B1comp | — | 0.4 | — | — | — | — |
| C/1 | 0.02 | — | — | — | — | — |
| C/2 | 0.04 | — | — | — | — | — |

TABLE 2

Increase of melt stiffness/shear viscosity by means of additive-modification:

| Melt volume rate [250° C./2.16 kg] | Unit | comp1 | comp2 | Ex. 1 | Ex. 2 | Ex. 3 | Ex. 4 |
| --- | --- | --- | --- | --- | --- | --- | --- |
| Retention time 4 min | $cm^3$/10 min | 31.6 | 13.6 | 18.6 | 10.8 | 19.1 | 7.5 |
| Retention time 10 min | $cm^3$/10 min | 35.6 | 13.9 | 18.2 | 8.1 | 19.0 | 5.7 |
| Retention time 20 min | $cm^3$/10 min | 41.5 | 15.8 | 18.4 | 6.3 | 20.7 | 4.8 |
| Retention time 30 min | $cm^3$/10 min | 48.2 | 18 | 21.8 | 6.3 | 23.2 | 4.9 |

The examples in table 2 illustrate the improved melt stiffness when the salts of the invention are added, in comparison with the polyester not using additive-modification in the invention. In the case of the polyester not using additive-modification, the melt volume rate increases with prolonged retention time as a result of polymer degradation, whereas in the case of the samples using additive-modification the melt flow rate (determined in accordance with ISO 1133) remains constant, this possibly being attributable to the formation of a microstructure. This effect is particularly distinctly discernible in Ex (1). Specifically, greatly reduced melt flow and therefore increased melt strength can be observed at an elevated concentration (3%) of the additives 1/2. The increased stiffness of the melt permits stable conduct of the process during extrusion, resulting in very homogeneous thickness of the cable sheathing and low ovality.

TABLE 3

Increase of recrystallization temperature through additive-modification

| Recrystallization | Unit | A | comp1 | comp2 | Ex. (1) | Ex. (2) | Ex. (3) | Ex. (4) |
|---|---|---|---|---|---|---|---|---|
| $T_{pc}$ | ° C. | 176.7 | 196.2 | 198 | 196.3 | 200.1 | 196.1 | 198.3 |

Table 3 shows calorimetric investigations by means of DSC in accordance with ISO 11357, heating and cooling rate 20 K/min. The peak crystallization temperature $T_{pc}$ was determined in the first cooling procedure. The examples in table 3 illustrate recrystallization at elevated temperature on addition of the salts of the invention, in comparison with the polyester not using additive-modification. A very sharp increase can already be discerned with the talc-nucleated material. A further increase of from 2.1 to 3.9° C. relative to the comparative example comp1 can be observed for the compounded materials of the invention with 3% loading.

I. Production of Optical-Conductor Sheathing Using Additive-Modification

Additive-modification of the polybutylene terephthalate by means of compounding results in reduced molecular weight. The additive-modified optical-conductor sheathing was produced by the process of the invention by way of additive concentrates. The concentrates were produced in a twin-screw extruder with 25 mm screw diameter (see table 4). Metering of the additives was achieved here together with the pellets in the cold feed system. In another step, the concentrates were mixed in a mixer with high-viscosity polymer pellets not subjected to additive-modification. It was thus possible in the subsequent processing step to obtain optical-conductor sheathing with high-molecular-weight polybutylene terephthalate.

TABLE 4

Production of concentrates

| Component | Conc. (1) [% by wt.] | Conc. (2) [% by wt.] |
|---|---|---|
| A | 95 | 79.94 |
| B1comp | 5 | — |
| B/1 | — | 20 |

Concentrate 2 also comprised 0.02% of C/1 and 0.04% of C/2.

Production of the Pellet Mixtures of the Invention:

The mixtures were produced in the form of pellets/pellet mixtures in a tumbling mixer.

TABLE 5

Composition of the cable sheathing of the invention

| Component [% by wt.] | C1 | C2 | C3 |
|---|---|---|---|
| A | 99.94 | 91.94 | 84.94 |
| C/1 | 0.02 | 0.02 | 0.02 |
| C/2 | 0.04 | 0.04 | 0.04 |
| Conc (1) | — | 8 | — |
| Conc (2) | — | — | 15 |

Production of Sheathed Optical-Conductor Cables:

The further processing of these pellet mixtures was achieved by means of a single-screw extruder with annular die. The production of such sheathing is described by way of example in the following document: H. J. Mair; Kunststoffe in der Kabeltechnik [Plastics in cable technology], chapter 9, Expertverlag 1983.

A 60 mm (L/D=24) Maillefer single-screw extruder was used. The line speed achieved during processing was 300 m/min.

TABLE 6

TEMPERATURE PROFILE DURING PROCESSING

| | | | Zone | | | | | | |
|---|---|---|---|---|---|---|---|---|---|
| | Feed zone | Zone 1 | Zone 2 | Zone 3 | Zone 4 | Adapter | Head | Water trough 1 | Water trough 1 |
| Temperature [° C.] | 210 | 275 | 275 | 275 | 275 | 275 | 275 | 275 | 55 | 18 |

During the production of the cable, a gel (jelly) (trade name: Unigel 400), the temperature of which was controlled to 80° C., was introduced between cable and sheathing. The sheathing procedure here was carried out with 12 glass-fiber conductors as core. The internal and external diameter of the glass-fiber cable sheathing can be found in table 5.

During the production of the cable C2, very significant formation of deposits could be observed on the annular die after only a short time; this did not occur in the case of the cable C3 of the invention.

1.1. Characterization of the Cable Sheathing

Figure 1:
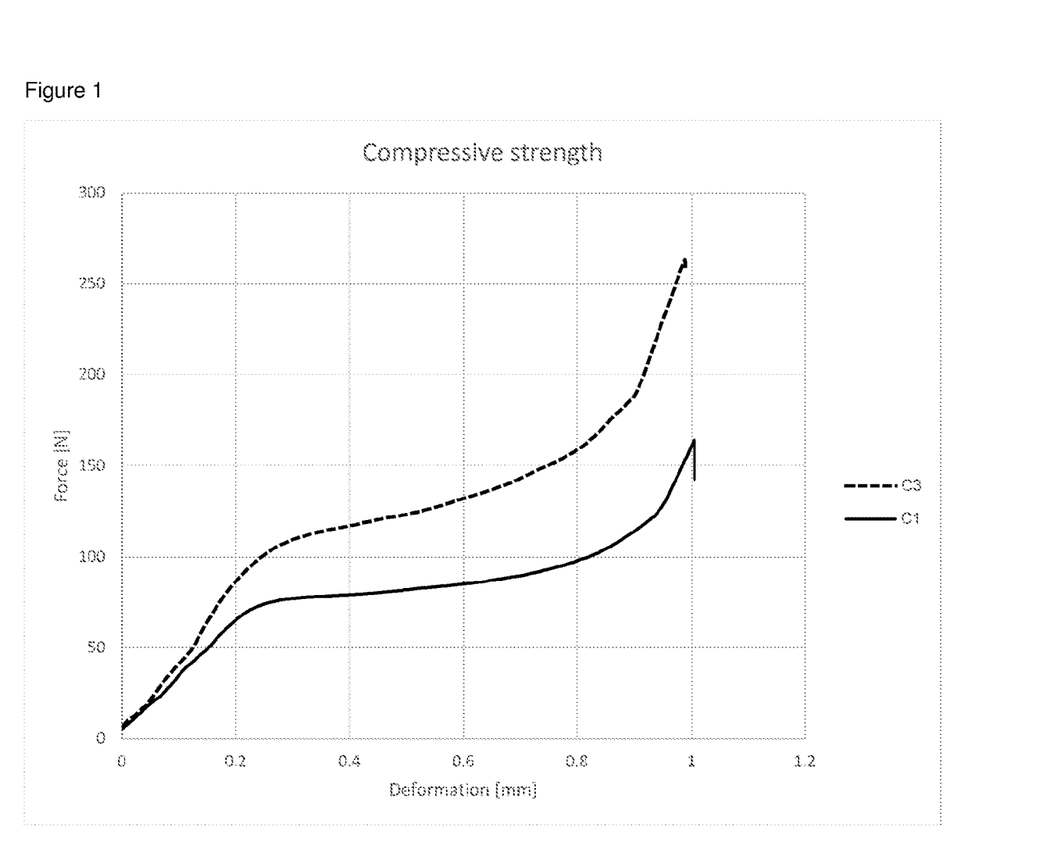
FIG. 1 is a graph of a Compressive strength measured in Force (N) vs. Deformation (mm) for inventive compositions C1 and C3.

The additive-modified cable sheathing of the invention exhibited substantially higher compressive strength (FIG. 1) than the prior art. Compressive strength was determined by means of a Zwick tester and pressure plate of length 80 mm, after removal of the optical conductor.

Figure 2:
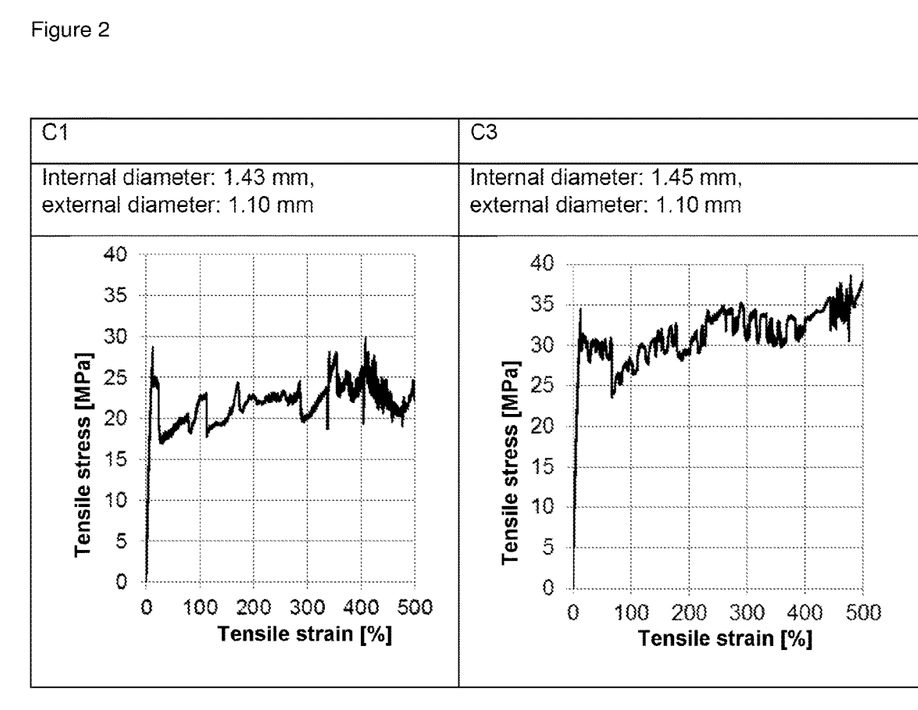
FIG. 2 contains graphs of Tensile stress (mPa) vs. Tensile strain (%) showing an increased yield stress for inventive compositions C1 and C3.

The substantially improved mechanical properties of the cable sheathing of the invention are also discernible in the tensile test, e.g. in substantially increased yield stress (FIG. 2). The tensile test was carried out with a Zwick Z050/BTC-FR050THA1 K in accordance with DIN EN ISO 527-1/-2 after removal of the optical conductor from the sheathing.

The experiments presented also revealed that, in comparison with the prior art, the formulations of the invention:

I. exhibit increased mechanical protective effect versus (e.g. U.S. Pat. No. 6,262,185B1)
II. exhibit substantially improved processability (no deposit on the annular die) versus WO2014146912A1.

The invention claimed is:

1. A cable sheathing or optical-conductor sheathing prepared by sheathing a cable or optical-conductor with thermoplastic molding composition comprising, as essential components:
   A) from 29 to 99.99% by weight of a polyester, where a carboxy end group content of component A) is from 10 to 50 meq/kg,
   B) from 0.01 to 10% by weight of an ionomer composed of at least one copolymer of
      $B_1$) from 35 to 89.95% by weight of ethylene
      $B_2$) from 10 to 60% by weight of 1-octene or 1-butene or propylene or a mixture of these, and
      $B_3$) from 0.05 to 70% by weight of functional monomers, where the functional monomers are selected from the group of the carboxylic acid groups, carboxylic anhydride groups, carboxylic ester groups, and mixtures of these,
   where component B) has been neutralized to an extent of at least 50% with alkali metal ions, and
   C) from 0 to 70% by weight of other additional substances, where the sum of the % by weight values for A) to C) is 100%.

2. The cable sheathing or optical-conductor sheathing according to claim 1, where the alkali metal of component B) comprises sodium or potassium or of a mixture of these.

3. The cable sheathing or optical-conductor sheathing according to claim 1, where the intrinsic viscosity (IV) of component A) in accordance with ISO 1628 is at least 140 ml/g.

4. The composition cable sheathing or optical-conductor sheathing according to claim 1, where component $B_3$) comprises an ethylenically unsaturated mono- or dicarboxylic acid.

5. The cable sheathing or optical-conductor sheathing according to claim 1, where component $B_3$) comprises acrylic acid, methacrylic acid, maleic anhydride, maleic acid, or fumaric acid, or of a (meth)acrylate having from 1 to 18 C atoms.

6. The cable sheathing or optical-conductor sheathing according to claim 1, where component B) comprises
   $B_1$) from 40 to 89.9% by weight of ethylene
   $B_2$) from 10 to 30% by weight of 1-octene or 1-butene or propylene or a mixture of these and
   $B_3$) from 0.1 to 30% by weight of functional monomers according to claim 1.

7. The cable sheathing or optical-conductor sheathing according to claim 1, wherein polyester A is present in an amount of 92 to 99.5% by weight.

* * * * *